June 19, 1923.  1,459,164

F. SCHORIK

WATER HEATER

Filed Sept. 5, 1922  2 Sheets-Sheet 1

Witnesses:

Inventor:
Frank Schorik
By Joshua R. H. Potts
His Attorney

June 19, 1923.

F. SCHORIK

WATER HEATER

Filed Sept. 5, 1922

1,459,164

2 Sheets-Sheet 2

Witnesses:

Inventor
Frank Schorik
By Joshua R H Potts
his Attorney

Patented June 19, 1923.

1,459,164

UNITED STATES PATENT OFFICE.

FRANK SCHORIK, OF CHICAGO, ILLINOIS.

WATER HEATER.

Application filed September 5, 1922. Serial No. 586,171.

*To all whom it may concern:*

Be it known that I, FRANK SCHORIK, a citizen of the United States, and a resident of the city of Chicago, county of Cook, and State of Illinois, have invented certain new and useful Improvements in Water Heaters, of which the following is a specification.

This invention relates to water heaters, and has for its object the provision of means of this character disposed adjacent a burner, and adapted to be heated thereby, and having connections leading to a storage tank, so that a constant supply of hot water is delivered to said tank.

Another object of the invention is to construct such heating means in combination with a vessel supporting spider, so that the heating means may be removed or replaced from operative position at will, the spider being adapted for use with or without the heating means being connected therewith.

Still another object of the invention is to dispose the heating element in the burner in such a manner that same does not interfere with the ordinary efficiency of the burner to any appreciable extent.

Other objects will appear hereinafter.

The invention consists in the combinations and arrangements of parts hereinafter described and claimed.

Figure 1:
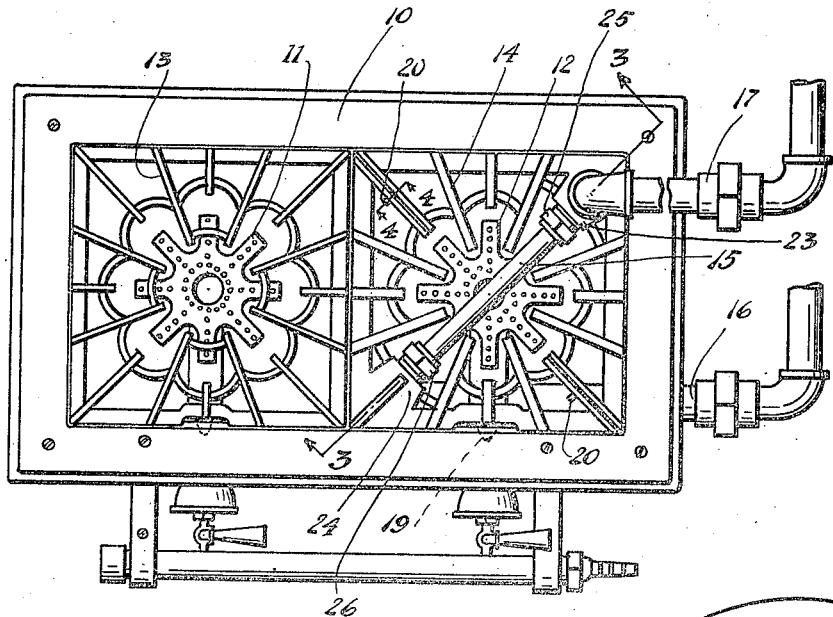
Figure 2:
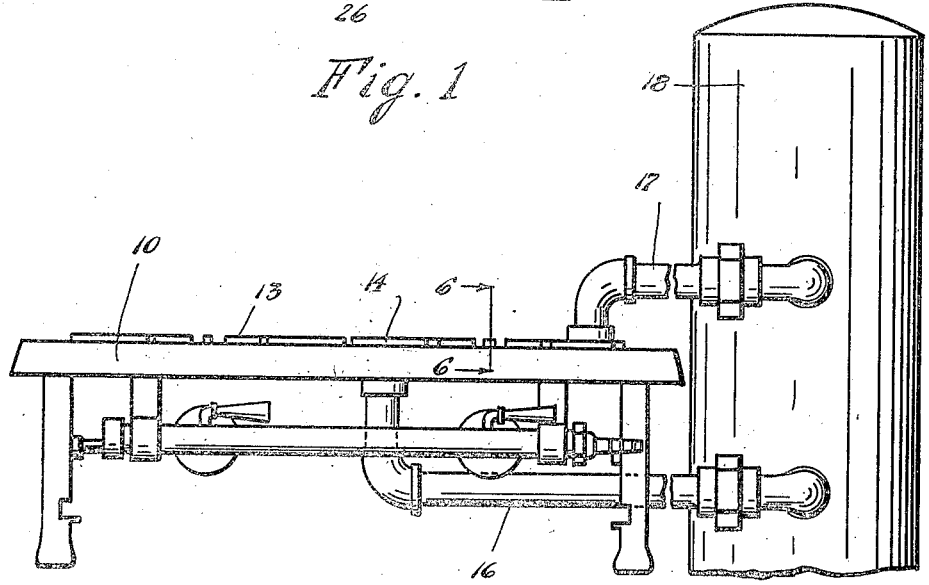
Figure 3:
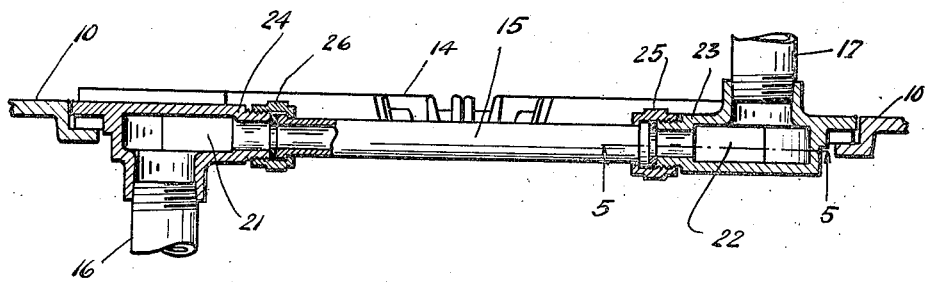
Figure 4:
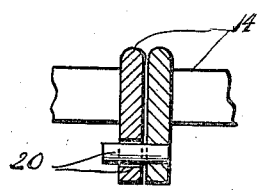
Figure 6:
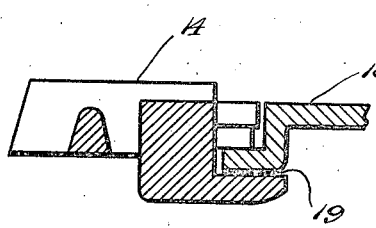
Figure 5:
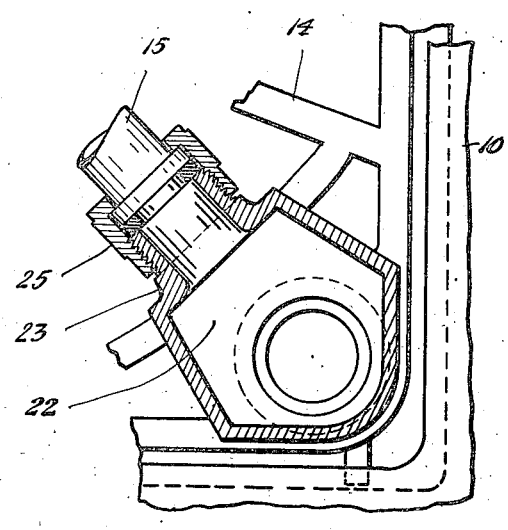

The invention will be best understood by reference to the accompanying drawings forming a part of this specification, and in which, Fig. 1, is a top plan view of the invention, Fig. 2, is a side elevation of the invention, showing a fragment of the storage tank associated therewith, Fig. 3, is a sectional view on the line 3—3 of Fig. 1, Fig. 4, is a sectional view on the line 4—4 of Fig. 1, Fig. 5, is a sectional view on the line 5—5 of Fig. 3, and, Fig. 6, is a sectional view on the line 6—6 of Fig. 2.

Referring to the drawings, 10 represents a stove of any ordinary type, being provided with burners 11 and 12, and having vessel supporting spiders 13 and 14, mounted thereon adjacent the burners 11 and 12 respectively.

Disposed adjacent the burner 12 is an elongated heating element 15, which has its ends communicating with connections 16 and 17 which lead to a storage tank 18. The heating element 15 is shown as mounted on the spider 14, but of course may be supported adjacent the burner 12 in any suitable manner; and similar heating elements may be provided for a plurality of burners, if desired, and all of such elements connected together by any suitable connections, as will be readily appreciated. By this arrangement it will be seen that a constant supply of hot water will be delivered to the tank 18 while the burners are operating, without interfering with the efficiency of the burners to any appreciable extent.

As stated, the heating element 15 may be supported adjacent the burner 12 by any suitable means, but I preferably construct same in combination with a spider of a particular type such as that shown at 14 in Fig. 1. The spider 14 is preferably made up of mated sections, adapted to rest in a countersunk bed 19, such sections being provided with stud and aperture connections 20 which aid in assembling the sections. Such sections are also provided with chambers 21 and 22 which communicate with the connections 16 and 17, respectively, and such chambers preferably are provided with inwardly projecting oppositely disposed bosses 23 and 24, as shown in the drawings. The heating element 15, which is elongated so as not to interfere with the efficiency of the burner, is preferably secured between the sections of the spider 14 by means of caps 25 and 26 mounted on such element and adapted to be threaded onto the bosses 23 and 24.

By the above construction, it will be seen that the heating element 15 may be held between the sections of the spider 14 by placing such sections in the countersunk bed 19; and if the countersunk bed is not desired it will be apparent that by threading the caps on the heating element onto the bosses 23 and 24 of the sections of the spider 14, such heating element will be held in position, as well as holding the sections of the spider together.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. The combination with a burner, of a storage tank, a conduit having portions connected with said storage tank and extending adjacent to said burner; a sectional vessel supporting member disposed over said burner and having said portions connected thereto; and a heating element communicating with said conduit portions and connected with said supporting member in such manner as to hold the same in assembled position.

2. The combination with a burner, of a storage tank, a conduit having portions connected with said tank and extending adjacent to said burner; a sectional vessel supporting member disposed adjacent to said burner and having said portions connected thereto; and a heating element communicating with said portions, said element being held in position between the sections of said supporting member when in assembled relation.

3. The combination with a burner, of a storage tank, a conduit having portions connected with said tank and extending adjacent said burner; a vessel supporting member connected to said portions and disposed adjacent said burner; and an elongated heating element mounted on said supporting member and communicating with said conduit portions.

4. The combination with a burner, of a storage tank, a conduit having portions connected with said tank and extending adjacent said burner; a vessel supporting member connected to said portions and disposed adjacent said burner; and an elongated heating element extending from one side to the other of said supporting member and communicating with said conduit portions.

5. The combination with a burner, of a storage tank, a conduit having portions connected with said tank and extending adjacent said burner; a vessel supporting member mounted adjacent to said burner and connected to said portions; and an elongated heating element extending from one side to the other of said supporting member and communicating with said portions, in the same plane as the outer surface of said supporting member.

6. The combination with a burner, of a storage tank, a conduit having portions connected with said tank and extending adjacent to said burner; a sectional vessel supporting member connected to said portions; and an elongated heating element mounted between the sections of said supporting member and communicating with said conduit portions.

7. The combination with a burner, of a storage tank, a conduit having portions connected with said tank and extending adjacent to said burner; a sectional supporting member connected to said portions the sections of said supporting member having oppositely disposed securing means communicating with said portions; and a heating element held between said sections and having its ends fastened to said securing means.

8. The combination with a burner, of a storage tank, a conduit having portions connected with said tank and extending adjacent to said burner; a sectional supporting member connected to said portions and disposed adjacent to said burner, the sections of said supporting member having oppositely disposed threaded bosses thereon communicating with said portions; and a heating element disposed between said sections; said heating element being provided with caps adapted to be threaded upon such bosses to hold said heating element in position and to hold said sections together.

9. The combination with a burner, of a storage tank, a conduit having portions connected with said storage tank and extending adjacent to said burner; a sectional supporting member connected to said portions; a countersunk bed for said supporting member; and a heating element communicating with said portions mounted between the sections of said supporting member and held in operative position when said sections are seated in said bed.

10. In combination with a stove having a countersunk supporting bed; a sectional vessel supporting spider adapted to rest in said bed; and a heating element disposed between the sections of said spider and held in operative position when said sections are placed in said bed; and means for circulating fluid through said heating element.

11. The combination of a stove, of a sectional utensil supporting spider mounted on said stove; and a heating element disposed between the sections of said spider and securing same together; and means for circulating fluid through said heating element.

12. The combination of a stove having a countersunk bed; a sectional utensil supporting spider adapted to be disposed in said bed; the sections of said spider having oppositely disposed securing means; and a heating element held between said sections and fastened to said securing means; and means for circulating water through said heating element.

13. The combination with a stove having a countersunk bed; a sectional utensil supporting spider adapted to be disposed in said bed, the sections of said spider having oppositely disposed threaded bosses thereon, a heating element disposed between said sections and having caps thereon adapted to be threaded onto said bosses; and means for circulating fluid through said heating element.

14. The combination with a stove having a burner; a sectional vessel supporting member mounted adjacent said burner, the sections of said member having registering stud and aperture guide means to aid in assembling said sections; individual connections on said sections; a heating element connected to said connections; and means for causing a circulation of fluid through said heating element.

In testimony whereof I have signed my name to this specification in the presence of two subscribing witnesses.

FRANK SCHORIK.

Witnesses:
 FREDA C. APPLETON,
 MARGARET AUER.